Nov. 26, 1957  J. R. BIRD ET AL  2,814,776
ABSORPTION MILLIWATTMETER WITH VOLTAGE DIVIDER
Filed May 29, 1956
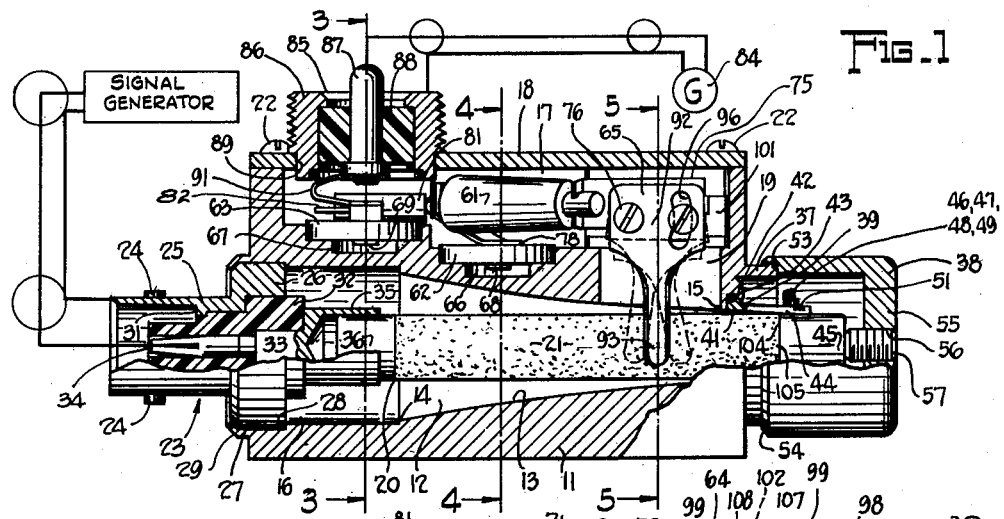
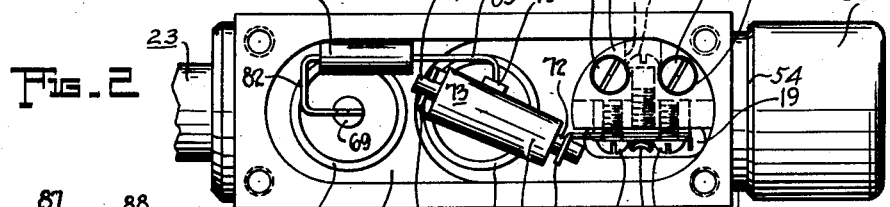
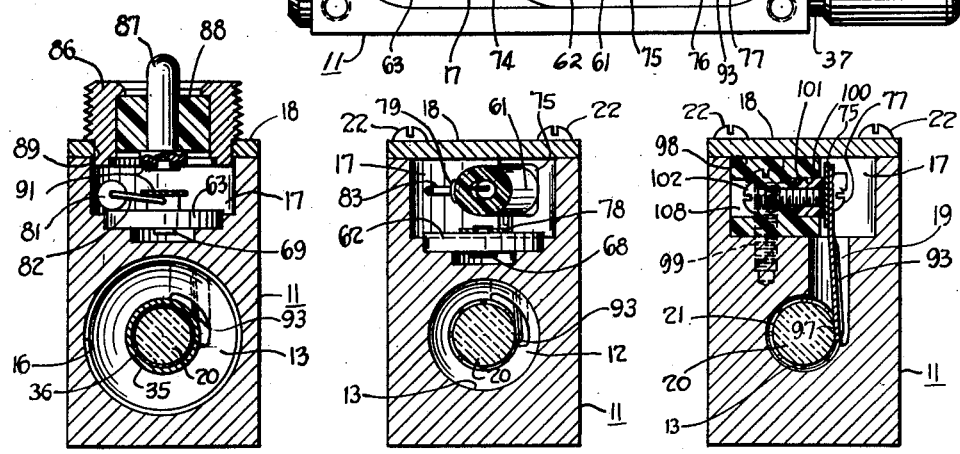
Fig. 3  Fig. 4  Fig. 5
Fig. 6
INVENTORS
James R. Bird
Laurence H Boles
by Schramm and Knowles
ATTORNEYS

United States Patent Office

2,814,776
Patented Nov. 26, 1957

2,814,776

ABSORPTION MILLIWATTMETER WITH VOLTAGE DIVIDER

James R. Bird, Chagrin Falls, and Laurence H. Boles, Cleveland Heights, Ohio, assignors to Bird Electronic Corporation, a corporation of Ohio Application May 29, 1956, Serial No. 588,017

15 Claims. (Cl. 324—95)

This application in part discloses subject matter contained in the copending application of Blossy D. Frederico, Serial No. 469,174, filed November 16, 1954.

The invention relates to electrical measuring devices for use in high-frequency adjustable resistance units and adjustable voltage dividers. The invention is particularly concerned with the provision of such devices for use over a wide frequency band.

An object of the invention is to provide termination resistor units with improved rugged, reliable, sturdy, inexpensive, easily adjusted means for tapping a fraction of the voltage drop in the terminating resistor.

High frequency electrical instruments present design and assembly problems that complicate creation of commercially successful devices. The effects of distributed capacitance and inductance disturb results obtained when components are conventionally arranged and connected. It has been generally recognized that the desired theoretical results can be approached more effectively in practice by resorting to compact assemblies having short connections. The accomplishment of short electrical connections between components of a high frequency electrical measuring device of the character referred to is therefore one of the principal objectives of the present invention, it being thus sought to obtain close adherence to theoretical circuit requirements and thereby improve operating accuracy generally.

Another objective is to provide a high frequency electrical device suitable for use in the measurement of voltage or power, for the supply of an adjustable voltage or for providing an adjustable magnitude of resistance, embodying components arranged in a compact rugged assembly that can be put together in original production and can be serviced and repaired easily.

Another object is to provide an instrument which provides for easy adjustment in original assembly and also in subsequent service to compensate for variations in sensitivity of components employed in the instrument.

A further object of the invention is to provide a combination single instrument in which the same unit serves both as a reflectionless termination for a high frequency coaxial transmission line and an andjustable voltage pick-up connection for an absorption type milliwattmeter.

A further object of the invention is to provide improved reliable, accurate, sturdy, and dependable apparatus for running tests on low-power transmitters such as walkie-talkies and the like, trouble shooting maintenance, production and acceptance tests, tests on insertion devices, such as connectors, filters, switches, tubing stubs, patch cords, and the like and which may also be used as an accurate radio frequency resistance having its resistance value substantially independent of frequency.

A further object of the invention is to provide a voltage divider resistance termination unit in the form of a unitary structure without external moving parts.

A further object of the invention is to provide an absorption type wattmeter which may readily be sealed hermetically to exclude air but retain insulating and coolant fluid.

Still another object of the invention is to eliminate any need for seals between moving parts.

Still another object is to simplify construction of an absorption type wattmeter, minimize the amount of material required, and enable the apparatus to be constructed inexpensively and quickly.

Still another object is to enable an absorption type wattmeter with a voltage divider to be adjusted more easily with only a simple swinging arm contact to be moved.

Other objects and advantages pertaining to certain features of construction or combinations and arrangements of parts which obtain simplicity and economy, as well as improved operating characteristics, will become apparent from the following detailed description of a preferred embodiment of the invention. This description is made in connection with the accompanying drawings in which:

Fig. 1 is an elevational view, principally in longitudinal section with parts broken away and removed, of a high-frequency measuring instrument embodying the principles of the present invention, the instrument being of the peak reading type employing capacitance-type peak voltage storage and incorporating in the combination a wholly enclosed pickup or rectifier circuit assembly securely and rigidly mounted within a common conductor body for the terminating resistor housing;

Fig. 2 is a top plan view of the apparatus of Fig. 1 with the cover plate removed to expose a portion of the interior;

Fig. 3 is a view of a cross section of the apparatus of Fig. 1 represented as cut by a plane 3—3, indicated in Fig. 1;

Fig. 4 is a view of a cross section cut by a plane 4—4 indicated in Fig. 1;

Fig. 5 is a view of a cross section cut by a plane 5—5, indicated in Fig. 1; and, Fig. 6 is an electrical circuit diagram of the assembly.

One way in which energy transmitted along a coaxial line has been measured is by sampling through the use of voltage pick-up of the capacitive or resistive type and by using a sample portion of energy or voltage to influence an indicator such as a galvanometer. To obtain a suitable sample from the main coaxial line without distortion, to rectify the sample, still without distortion, and then to impress the rectified portion on a galvanometer or milli-voltmeter external to the line has presented numerous difficulties related to the structure or geometry of the line and instrument components, particularly in connection with the measurement of electrical voltage or energy in the high frequency ranges.

Electrical instruments or devices embodying the present invention are characterized by a conductor body having a horn chamber serving as a terminating resistor housing and an adjacent pick-up and rectifier chamber with an access aperture or passageway between the two chambers. In an illustrative embodiment shown in the drawings, the invention is used as a milliwattmeter or voltmeter of the peak reading type, in which the pick-up unit is wholly enclosed in a chamber in a conductor body having an adjacent chamber arranged as a coaxial line in the form of a reflectionless termination. The instrument provides accurate voltage division independent of frequency and is intended for use over a wide range of frequencies. Although not limited thereto, it is especially useful in the frequency range from about five to five hundred megacycles, utilizing a resistive termination capable of dissipating approximately five watts although capable of substantial overload at the power input. It will be apparent, however, that the principles disclosed in connection with this embodiment are useful in other types of instruments and over other wide frequency bands or at other frequencies by suitable modification.

As illustrated, there is a conductor body 11 of suitable highly conductive material such as brass, or the like, having a first longitudinal chamber 12 formed therein in any suitable manner as by boring to provide a circular cross-sectioned internal horn surface 13 tapering from a maximum diameter at a point 14 to a minimum diameter at an end 15 with a cylindrical chamber extension 16 at the larger diameter end of the chamber.

A second chamber 17 is formed in the body 11 extending substantially the length of the first chamber 12, adjacent thereto but open sided intsead of open ended, and having a rectangular cover plate 18 for enclosing the second chamber. A passageway or lateral access aperture 19 is provided between the two chambers at or toward the smaller diameter end of the chamber 12.

Coaxial with the internal horn surface 13 there is mounted an elongated cylindrical resistor rod which may take the form of a cylindrical rod or tube 20 of insulating material such as ceramic material, for example, having deposited on the surface thereof a resistance carbon film 21. The curvature of the surface 13 and the resistance of the carbon film conductor 21 are so related in accordance with known principles that at each point along the length of the line, the center conductor termination resistance between such point and the end of the line is equivalent to the characteristic impedance of the line measured at that point. Here the rod or tube carrying the resistive film 21 is a nominal one-quarter inch in diameter and the effective length of the resistive film is one and one-half inches, the other parts being proportioned as shown to provide about five watts power absorption on a nominal 50-ohm line.

For coaxially supporting the resistor rod 20, supporting and electrical connecting means are provided at both open ends of the chamber 12. At the left hand end, partially within the chamber extension 16, a coaxial line socket type connecting fitting 23 is provided which is shown as a bayonet type fitting with lateral lugs 24, although the invention is not limited to the use of a specific type of concentric line fitting. The fitting 23 illustrated comprises a tubular body 25 having an enlarged diameter cylindrical base 26 fitting within a counterbore 27 of the cylindrical chamber extension 16 against a shoulder 28 and secured by a lip 29 formed in the body 11 and spun over. The tubular body 25 is provided with an internal ridge 31 and has a stepped internal diameter for receiving and axially locating a tubular insulator bushing 32 of stepped internal and external diameter and receiving in turn a stepped internal diameter center conductor connector rod 33.

The connector rod 33 has a conventional split end pin portion 34 for receiving the conical tip of a conventional coaxial line plug type connection fitting and is formed with a contact socket 35 at the inner end to receive the left hand end 36 of the resistor rod 20 which is preferably banded or coated with a conductive material such as silver paint or the like, to make good electrical connection with the resistance surface 21.

At the right hand end of the horn-surface chamber 12 a tubular extension 37 is formed in the body 11 to receive a cap 38, and a resistor rod connector fitting 39 is provided. The connector 39 is in the form of a conductor sleeve of brass or the like, with a base 41 secured at the small diameter end of the chamber 12 in a counterbore 42 with edges 43 staked over to secure the base 41 of the sleeve 39. The remainder of the sleeve 39 is slotted to form contact fingers 44. The inner diameter of the sleeve within the contact fingers 44 equals the minimum diameter of the tapered inner surface 13 and corresponds to the outer diameter of the center conductor 20 so as to make good electrical contact therewith at the right hand end of the resistor surface 21 which is also preferably coated with a band 45 of good electrically conductive material such as silver paint or the like.

It will be observed that the portion of the sleeve 39 consisting of the fingers 44 has a relatively small axial thickness in relation to the thickness of the base 41, so that the fingers 44 are relatively flexible.

For insuring tight gripping of the conductor band 45 by the fingers 44 and avoiding any resistance other than that of the resistance surface 21, a plurality of clamping rings 46, 47, 48 and 49 are employed. For example, as illustrated there may be four such clamping rings, although the invention is not limited thereto. Such clamping rings 46 to 49 may be of a form manufactured by Waldes-Kohinoor, Inc., of Long Island City, New York, and sold under the name of TRU-ARC rings. Each clamping ring has a pair of ears, not shown, for receiving a suitable tool to spread the rings during the assembling. The bending stress of the rings contracts them after assembly has been completed. An annular groove 51 is machined in the fingers 44 to retain the ring 49. The ring 49 thus prevents the other rings 46 to 48 from slipping off the fingers 44. Since there are no grooves for the rings 46 to 48, these remain under stress to force the fingers 44 against the conductor band 45 for insuring good electrical contact, as described in greater detail in the co-pending application of Herbert H. Heller, Serial No. 513,293, filed June 6, 1955.

The left hand end of the chamber 12 is hermetically sealed by the fitting 26 in the counterbore 27 and the cap 38 serves for hermetically sealing the right hand end opening of the chamber 12. The cylindrical extension 37 is formed with a rim 52 fitting within a counterbore 53 formed in the cap 38, the edge or lip 56 of which is spun over the rim 52 to form a tight seal.

The cap 38 has a relatively thick base 55 with threaded hole 56 receiving a set screw 57 for pushing the rod 20 into the socket 35 and holding the parts in assembled relation.

The chamber 17 is utilized for mounting a rectifier 61, a button type peaking condenser 62, a button type bypass condenser 63, and insulating supporting block means 64 for pivotally mounting a probe 65, extending through the passageway 19 to make contact with the cylindrical surface of the resistance coating 21. As illustrated, preferably, counterbored sockets 66 and 67 are formed in the internal surfaces of the chamber 17 toward the chamber 12 for receiving the button condensers 62 and 63 so that their central terminals 68 and 69 will be insulated from the conductor body 11 while, preferably, their peripheries constituting terminals with outside circular edges will make electrical contact with the conductor body 11. Preferably, to insure good electrical contact, the button condensers 62 and 63 are soldered in place in the counterbores of the sockets 66 and 67. It will be understood that the button type condensers 62 and 63 are of the conventional type with one set of conductive plates or leaves electrically connected to the rims which serve as the outer peripheral terminals, and one set of plates connected to a center pin terminal 68 or 69, extending through the button or disk constituting the condenser assembly.

Electrical energy is fed into the present device as from a high-frequency generating source, which is to be tested or measured, through a suitable coaxial transmission line connected to the device through the outer connector element 25 and the inner connector element 33, the electrical energy for the device having a frequency of the order of five to five hundred megacycles. The termination, constituting the tapered surface 13 of the conductor body 11 in the chamber 12 and the resistor film 21 of the inner conductor rod 20 absorbs such energy to the extent of about five watts, substantially without reflection, it being understood that the several changes of diameter and dielectric along the length of the line, including that portion formed by the inner and outer surfaces 21 and 13, respectively, are suitably proportioned to maintain the characteristic impedance of the line, here nominally 50 ohms, in accordance with well-known considerations.

The rectifier 61 is any one of several well-known constructions, such as that marketed by the General Electric Company and known as Germanium Diode Model G7B, or by Sylvania and known as model 1N21B or 1N79. It comprises a germanium pellet or semiconductor crystal, contacted by a metal wire or so-called cat whisker. Neither the pellet nor the cat whisker are shown since they are sealed within the rectifier structure 61 and do not constitute the present invention. In the case of the model 1N21B rectifier, the crystal and cat whisker are mounted on the ends of posts or pins 71 and 72 of nickel or other similar metal.

The rectifier 61 may be of the type mounted within a conductive shell 73 which is electrically connected to the pin 71. For supporting the rectifier 61 spring clips 74 and 75 are provided adapted to receive the pins 71 and 72 respectively. The clips 74 and 75 may be made of sheet metal, such as spring brass or the like. The clip 75 is secured to the insulating block means 64 by means of cap screws 76 and 77.

The clip 74 is formed with a supporting base 78 secured to the center terminal 68 of the condenser 62, preferably by soldering. The clip 74 is provided also with an ear 79 which may make electrical contact with the surrounding shell 73 of the rectifier 61. A charge resistor 81 is provided having bendable wire terminals 82 and 83 which serve both for making electrical connections to the resistor 81 and supporting it. The wire terminal 83 is soldered to the ear 79 of the clip 74 and the wire terminal 82 is soldered to the central terminal 69 of the condenser 63.

For making electrical connections to an external instrument such as a galvanometer or millivoltmeter 84, a conventional type of concentric direct-current connector 85 is provided having an externally threaded tubular terminal 86 adapted to receive a conventional coupling nut and a center pin terminal 87 supported in the tubular terminal 86 by an insulator bushing 88. The tubular terminal 86 is brazed or soldered in a circular opening 89 formed in the cover plate 18 of the chamber 17 and the center pin terminal 87 extends through the bushing 88 into the interior of the chamber 17 so that chambers 12 and 17 may be fully enclosed and hermetically sealed. For making electrical connection between the center terminal 69 of the condenser 63 as well as to the terminal wire 82 of the charge resistor 81, a hairpin type leaf spring contact 91 is soldered, riveted or otherwise electrically connected and secured to the inner end of the direct-current connector terminal pin 87.

The probe 65 is formed with a support portion 92 and a contact finger portion 93. The screws 76 and 77 supporting the clip 75 serve also for supporting the probe 65 and to this end the supporting portion 92 of the probe is provided with a pivot receiving hole 95 through which the screw 76 passes and an arcuate adjustment slot 96 through which the screw 77 passes. As illustrated the probe 65 is composed of a suitable resilient sheet metal, such as spring brass, for example, the finger portion 93 being curved in cross section with a convex surface 97 lying against the cylindrical resistor surface 21 to form a point contact therewith.

To facilitate assembly the insulating block means 64 is in two parts, including a supporting block 98 secured in the chamber 17 by suitable screws 99. There is a cavity 100 formed therein to receive an insert insulator block 101 receiving the screws 76 and 77, and the block 101 is secured by a screw 102.

Before the device as a whole is assembled, the button condensers 62 and 63 are soldered in place and the clip and connector 74 is soldered to the center terminal 68 of the button condenser 62, the latter preferably being done in a jig or before the condenser 62 is soldered in place. The terminating resistance subassembly consisting of the turning 25, the insulator bushing 32 and the center rod, pin and socket fitting 33 are assembled before securing the base 26 of the turning 25 in the counter bore 27 and sprinning over the edge 29.

The slotted sleeve 39 is assembled with the body 11 by inserting its base 41 in the counterbore 42 and staking the edges 43 of the counterbore. Thereafter, the ceramic rod 20 having the resistance film 21 and the conductor bands 36 and 45 is pushed into the socket 35 of the fitting 33. In so doing the conductive band 45 is also pressed into contact with the contact fingers 44 of the slotted sleeve 39, whereupon the TRU-ARC rings 46, 47 and 48 are assembled in that order on to the fingers 44 by the use of a suitable expanding tool; thereafter, the last TRU-ARC ring 49 is assembled and permitted to drop into the slot 51 for holding the other TRU-ARC rings in place axially.

The radial forces applied continuously to the axially extending contact fingers 44 by the stressed rings 46, 47, 48 and 49 cause the fingers 44 to grip the ceramic rod yieldingly. The curved inner surface 13 of the chamber 12 is continued on to the fingers 44 and the inner surfaces of the fingers at their outer ends are relieved in the provision on each of the fingers of an axial short land 104 which bears strongly against the conductor band 45 at a circular junction line 105 between the conductor band and the resistive film 21.

The cap 38 is then assembled and the lip 54 is spun over the rim 52. Thereafter the set screw 57 is tightened to hold the ceramic rod 20 snugly in position.

The resistor 81 may then have its wire terminals 82 and 83 soldered in place.

Preferably the clip 75 and the base portion 92 of the probe 65 are first assembled with the insert block 101 by inserting the screws 76 and 77. The insert block 101 is then assembled with the supporting insulating block 98 and the probe finger 93 is set at the desired angle to give the prescribed voltage division of the voltage drop in the resistance film 21. The supporting insulator block 98 is thereafter assembled with the conductor body 11 and secured by means of screws 99. A counterbore 108 is provided in the block 98 to receive the head of the screw 102.

The cover plate 18 is then mounted in position with suitable gasket material (not shown) preferably included around the edges of the lateral opening in the chamber 17 under the cover plate 18 if it is desired to make the housings 12 and 19 air, fluid, or liquid tight. It will be understood that the tubular connection fitting 86 has already been assembled with the cover plate 18 by sinking it into the opening 89 therein and soldering or brazing the joint.

As explained, the ratio of voltage picked up to that received at the input end of the body 11 in the connector 23 is determined by the angular position of the probe finger 93. This adjustment is made before securing block means 64 in the body 11 by loosening and retightening the screws 99 and 77. Once adjusted, however, no further changes are needed and the cover 18 for the chamber 17 may be left in position. The adjustment securing screw 77 is protected against tampering and no seals of joints between moving parts are required.

The connections of the electrical elements are shown schematically in the circuit diagram of Fig. 6. As illustrated, contact is made between the probe finger 93 and the resistance film surface 21 of the rod 20. The conductor body 11 is electtrically connected to the resistance film 21 and to one side of the direct-current instrument 84, as well as to the peripheral terminals of the condensers 62 and 63. The rectifier 61 is connected in series between the probe finger 93 and the terminal 83 of the resistor 81 at the center terminal of the condenser 62. The millivoltmeter 84 is shown as connected between the banded end 45 of the resistance film 21 and the finger 93 through the rectifier 61 and the charge resistor 81. In consequence the peak valve of the radio frequency voltage appearing between the probe 65 and the right hand end of the coaxial conductors 11 and 21 is stored between the plates of the charge condenser 62. The root-mean-square value of the radio-frequency voltage in question may be measured by ascertaining the unidirectional or direct-current voltage between the plates of the charge condenser 62 by means of a suitable device such as a galvanometer 84 calibrated in terms of R. M. S. voltage. The charge resistor 81 provides a calibration for the galvanometer 84 and together with the bypass condenser 63 serves to by-pass radio frequency energy from the circuits of the galvanometer 84.

In accordance with the provisions of the patent statutes, the principle of operation of the invention has been described together with the apparatus now believed to represent the best embodiment thereof, but it is to be understood that the apparatus shown and described is only illustrative and that the invention may be carried out by other arrangements.

What I claim and desire to secure by Letters Patent of the United States is:

1. A radio-frequency measuring device comprising in combination a conductor body having first and second longitudinal chambers therein adjacent each other, each with first and second ends, with a passageway between the chambers at the two ends thereof, the first chamber having an internal tapered horn surface with a minimum diameter at the second end of the chamber, a resistance rod secured in the first chamber coaxially, with free and connected ends, means electrically connecting the connected end of the resistance rod to the conductor body at the second end of the first chamber, a coaxial line connector at the free end of the resistor rod connected thereto and to the surrounding portion of the conductor body, a rectifier mounted in the second chamber between the ends thereof, with first and second terminals, a direct-current millivoltmeter connector fitting at the first end of the second chamber with a terminal connected to the conductor body and a center terminal insulated therefrom connected to the first rectifier terminal, a probe connected to the second rectifier terminal having a pivoting insulated mounting in the second end of the second chamber extending through said passageway into the first chamber and contacting the surface of the resistor rod for delivering to the millivoltmeter connector fitting a voltage constituting a fraction of that appearing in the resistor rod determined by the angular position of the probe mounting.

2. In a system for sampling high-frequency electrical energy, the combination comprising a conductor body having a first longitudinal chamber therein with first and second ends and a second chamber therein, adjacent the first, with first and second ends, and a passageway extending transversely from the first chamber to the second, the first chamber having an internal horn surface tapering to a minimum diameter at the second end of the chamber, a resistor rod received in the first chamber coaxially, with a free end and an end connected to the conductor body at the second end of the first chamber, a coaxial line connector at the free end of the resistor rod connected thereto and to the surrounding portion of the conductor body at the first chamber, a rectifier mounted in the second chamber between the first and second ends thereof with first and second terminals, a direct-current connection fitting mounted on the second chamber with a terminal connected to the conductor body and a center pin terminal insulated therefrom connected to the first rectifier terminal, and a probe connected to the second rectifier terminal, having a pivoting insulated mounting in the second chamber, extending through said passageway into the first chamber and contacting the surface of the resistor rod for delivering to the direct-current connection fitting a voltage constituting a fraction of that appearing on the resistor rod, determined by the angular position of the probe mounting.

3. A combination as in claim 2 wherein the probe comprises conductive sheet metal with a finger formed with a convex surface peripherally contacting the resistance rod to accomplish a point contact between the two.

4. A device as in claim 2 wherein a peaking condenser is provided, connected between the conductor body and the first rectifier terminal.

5. A device as in claim 4 wherein a resistor is interposed between the center pin terminal and the first rectifier terminal.

6. A device as in claim 5 wherein a by-pass condenser is connected between the center pin terminal and the conductor body.

7. A device as in claim 4 wherein a socket is formed in the conductor body adjacent the rectifier location in the second chamber, and the condenser comprises a button condenser mounted in said socket having a center terminal and having a peripheral terminal soldered in said socket, and a rectifier support conductor is soldered to the center terminal of the condenser whereby the rectifier is mounted in the second chamber.

8. Apparatus as in claim 6 wherein the by-pass condenser constitutes a button condenser having center and peripheral terminals and a socket is formed in the conductor body to receive the peripheral terminal of the by-pass condenser.

9. Apparatus as in claim 8 wherein the peaking condenser constitutes a button condenser having a peripheral terminal contacting the conductor body and a center terminal, and the resistor is connected between the center terminals of the condensers.

10. Apparatus as in claim 9 wherein the direct-current connector terminal is mounted at one side at an end of the second chamber and a by-pass condenser mounting socket is mounted in the second chamber opposite the direct-current connector.

11. Apparatus as in claim 10 wherein a hairpin type compression leaf spring is mounted between the center pin terminal of the direct-current connector and the center terminal of the by-pass condenser for completing the electrical circuit.

12. Apparatus as in claim 11 wherein the conductor body is open at one side along the said second chamber and a cover plate is provided for closing said second chamber, the direct-current connection fitting being mounted on said cover plate.

13. Apparatus as in claim 12 wherein the insulating probe mounting comprises an insulator block secured in the second chamber, and an insert block secured in the first mentioned insulator block, the probe being secured to the insert block.

14. Apparatus as in claim 13 wherein the probe has a supporting portion to which the finger is joined, having a screw hole therein for pivotal securement to the insulated mounting, and an arcuate slot for receiving a securing screw to fix the angular position of the finger adjustably.

15. In a system for sampling high frequency electrical energy, the combination comprising a conductor body having a first longitudinal chamber therein with first and second ends, a second chamber therein, adjacent the first, with first and second ends, and a passageway extending transversely from the first chamber to the second, the first chamber having an internal horn surface tapering to a minimum diameter at the second end of the chamber, a resistor rod received in the first chamber coaxially, with a free end and an end connected to the conductor body at the second end of the first chamber, the free end of the resistor rod and the conductor body being adapted for connection to a coaxial high-frequency electrical transmission line, a rectifier mounted in the second chamber with first and second terminals, the first terminal of the rectifier and the conductor body being adapted for connection to a direct-current measuring circuit, and a probe composed of spring strip material connected to the second rectifier terminal having an insulating mounting in the second chamber, with the probe extending through said pasageway into the first chamber and having a lateral surface electrically contacting the surface of the resistor rod for delivering to the rectifier a voltage constituting a fraction of that appearing on the resistor rod, determined by the angular position of the probe mounting.

No references cited.